US011279196B2

United States Patent
Okimura et al.

(10) Patent No.: US 11,279,196 B2
(45) Date of Patent: Mar. 22, 2022

(54) DAMPING FORCE CONTROL DEVICE

(71) Applicant: TOYOTA JIDOSHA KABUSHIKI KAISHA, Toyota (JP)

(72) Inventors: Kohtaroh Okimura, Nissin (JP); Masaaki Tabata, Nagoya (JP); Yoshinori Takamura, Toyota (JP); Ryo Masutani, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 150 days.

(21) Appl. No.: 16/405,412

(22) Filed: May 7, 2019

(65) Prior Publication Data

US 2019/0351726 A1    Nov. 21, 2019

(30) Foreign Application Priority Data

May 16, 2018  (JP) .............................. JP2018-094218

(51) Int. Cl.
*B60G 17/0195*   (2006.01)
*B60G 17/0165*   (2006.01)
(Continued)

(52) U.S. Cl.
CPC ....... *B60G 17/0195* (2013.01); *B60G 17/018* (2013.01); *B60G 17/0152* (2013.01);
(Continued)

(58) Field of Classification Search
CPC ............. B60G 17/0165; B60G 17/018; B60G 17/0195; B60G 17/06; B60G 17/08;
(Continued)

(56) References Cited

U.S. PATENT DOCUMENTS 4,065,154 A * 12/1977 Glaze ................... B60G 17/018
                                                          280/5.513
4,838,394 A *  6/1989 Lemme .................. B60G 17/08
                                                          188/282.1
(Continued)

FOREIGN PATENT DOCUMENTS

EP      491440 A1 *  6/1992
FR     2963072 A1 *  1/2012   ................ F16F 9/46
(Continued)

OTHER PUBLICATIONS

EPO machine translation of JP 2005-035489A (original JP document published Feb. 10, 2005) (Year: 2005).*
(Continued)

*Primary Examiner* — David A Testardi
(74) *Attorney, Agent, or Firm* — Sughrue Mion, PLLC

(57) ABSTRACT

A damping force control device 10 comprises vary damping shock absorbers, a detector, and a controller. Each of the shock absorbers sets damping coefficient from a minimum value to a maximum value in order to adjust damping force. The detector detects vertical vibration state quantity relating to vibration of the sprung mass. The controller performs an ordinary control for setting the damping coefficient based on the vertical vibration state quantity and according to a predetermined control law suitable for an assumption that all of the wheels touch ground. The controller performs, when at least one of the wheels is an ungrounded wheel which does not touch the ground and each of the other wheels is a grounded wheel which touches the ground, a specific control for setting the damping coefficient of the shock absorber corresponding to the grounded wheel to a first specific value greater than the minimum value.

7 Claims, 6 Drawing Sheets

(51) Int. Cl.
  *B60G 17/08* (2006.01)
  *B60T 8/175* (2006.01)
  *B60G 17/015* (2006.01)
  *B60T 8/26* (2006.01)
  *B60G 17/018* (2006.01)

(52) U.S. Cl.
  CPC ......... *B60G 17/0165* (2013.01); *B60G 17/08* (2013.01); *B60T 8/175* (2013.01); *B60T 8/26* (2013.01); *B60G 2200/10* (2013.01); *B60G 2204/62* (2013.01); *B60G 2204/80* (2013.01); *B60G 2204/8102* (2013.01); *B60G 2400/208* (2013.01); *B60G 2400/252* (2013.01); *B60G 2400/821* (2013.01); *B60G 2500/104* (2013.01); *B60G 2600/182* (2013.01); *B60G 2800/162* (2013.01); *B60T 2210/14* (2013.01); *B60T 2250/00* (2013.01); *B60T 2260/06* (2013.01); *B60T 2270/20* (2013.01)

(58) Field of Classification Search
  CPC ........ B60G 2204/80; B60G 2208/8102; B60G 2204/8102; B60T 2260/06
  See application file for complete search history.

(56) References Cited

U.S. PATENT DOCUMENTS

| | | | | |
|---|---|---|---|---|
| 5,527,060 A | * | 6/1996 | Kutsche | B60G 17/0152 280/124.157 |
| 5,718,446 A | * | 2/1998 | Fuchida | B60G 17/0164 280/124.157 |
| 5,828,970 A | * | 10/1998 | Kimura | B60G 17/018 701/37 |
| 6,352,318 B1 | | 3/2002 | Hosomi et al. | |
| 6,502,837 B1 | * | 1/2003 | Hamilton | B60G 17/0152 280/5.515 |
| 7,016,778 B1 | * | 3/2006 | Ehmer | B60T 8/175 180/197 |
| 2005/0217953 A1 | * | 10/2005 | Bossard | F16F 9/466 188/281 |
| 2005/0236782 A1 | * | 10/2005 | Kobayashi | B60G 21/06 280/6.159 |
| 2007/0021886 A1 | * | 1/2007 | Miyajima | B60G 17/019 701/37 |
| 2008/0164111 A1 | * | 7/2008 | Inoue | B60G 17/021 188/297 |
| 2009/0079145 A1 | * | 3/2009 | Inoue | B60G 17/06 280/5.515 |
| 2011/0025000 A1 | * | 2/2011 | Inoue | B60G 17/0157 280/5.507 |
| 2011/0241299 A1 | * | 10/2011 | Harada | B60G 17/08 280/5.513 |
| 2011/0298399 A1 | * | 12/2011 | Ogawa | B60G 17/06 318/14 |
| 2014/0353934 A1 | * | 12/2014 | Yabumoto | B60G 17/015 280/5.515 |
| 2015/0203124 A1 | * | 7/2015 | Fairgrieve | B60K 35/00 701/23 |
| 2017/0334261 A1 | | 11/2017 | Tsumano | |
| 2019/0232734 A1 | * | 8/2019 | Koike | B60C 23/08 |

FOREIGN PATENT DOCUMENTS

| | | | | | |
|---|---|---|---|---|---|
| GB | 1604416 A | * | 12/1981 | ........... | B60G 17/018 |
| JP | 02-060807 A | | 3/1990 | | |
| JP | 05096924 A | * | 4/1993 | | |
| JP | 06032131 A | * | 2/1994 | | |
| JP | 6-247130 A | | 9/1994 | | |
| JP | 7-246819 A | | 9/1995 | | |
| JP | 08-048124 A | | 2/1996 | | |
| JP | 10-000912 A | | 1/1998 | | |
| JP | 10138728 A | * | 5/1998 | | |
| JP | 11091327 A | * | 4/1999 | | |
| JP | 2000-344085 A | | 12/2000 | | |
| JP | 2005035489 A | * | 2/2005 | | |
| JP | 2007302199 A | * | 11/2007 | | |
| JP | 2011173503 A | * | 9/2011 | ................ | F16F 9/46 |
| JP | 2013-133085 A | | 7/2013 | | |
| JP | 2017-206161 A | | 11/2017 | | |

OTHER PUBLICATIONS

EPO machine translation of JP 2007-302199A (original JP document published Nov. 22, 2007) (Year: 2007).*

JPO machine translation of JP 2005-035489 (original JP document published Feb. 10, 2005) (Year: 2005).*

EPO machine translation of JP 6-247130 (original JP document published Sep. 6, 1994) (Year: 1994).*

* cited by examiner

DAMPING FORCE CONTROL DEVICE

BACKGROUND

Technical Field

The present disclosure relates to a damping force control device for setting a damping coefficient of a shock absorber arranged between a sprung mass part and an unsprung mass part of each of wheels.

Related Art

Hitherto, there has been known a damping force control device with a variable damping shock absorber. Such a shock absorber is configured to vary a damping coefficient.

As proposed in Japanese Patent Application Laid-open No. 2017-206161, such a damping force control device (hereinafter, referred to as a "conventional device") calculates a target damping coefficient which is appropriate to damp/attenuate vibration of a sprung mass part (namely, a vehicle body) based on a predetermined control law and a vertical state quantity of the sprung mass part. The conventional device controls the shock absorber in such a manner that the damping coefficient coincides with (becomes equal to) the target damping coefficient.

SUMMARY

While the vehicle is traveling/moving on an extremely rough/uneven road (a mogul road, an off-road, or the like) and when one of the wheels runs onto a relatively high obstacle, one or two wheel(s) other than the wheel which is on the relatively high obstacle may not touch the ground. The shock absorber corresponding to the wheel which does not touch the ground (hereinafter, referred to as an "ungrounded wheel") cannot generate the damping force.

However, the conventional device calculates the damping coefficient of the shock absorber corresponding to each of the wheels based on the predetermined control law on the assumption that all of the wheels touch ground. Therefore, when at least one of the wheels becomes the ungrounded wheel, it is likely that "the damping force generated by the shock absorber corresponding to each of "grounded wheels which touch the ground" cannot attenuate/reduce the vibration of the vehicle body (the sprung mass part) sufficiently. This degrades/worsens "a ride comfortability and a drivability when the vehicle is moving/travelling on the extremely rough road".

The present disclosure has been made to solve the problem described above. The present disclosure has an object to provide a damping force control device which can attenuate/reduce the vibration of the vehicle body when the vehicle is moving/traveling on the extremely rough road so as to prevent the ride comfortability and the drivability from becoming worse.

A damping force control device (referred to as "the present device") according to the present disclosure comprises;

a plurality of variable damping shock absorbers (20FL through 20RR) configured to vary damping coefficient (Ci) within a range from a minimum value (Cmin) to a maximum value (Cmax) greater than the minimum value in order to adjust damping force, each of the shock absorbers arranged between a sprung mass part and an unsprung mass part at a position corresponding to each of wheels (12) of a vehicle (14);

a detector (30FL through 30RR) for detecting vertical vibration state quantity (GzFL through GzRR) relating to vibration in vertical direction of the sprung mass part at the position of each of the wheels; and a controller (26FL through 26RR, 28, Step 320) configured to perform an ordinary control for setting the damping coefficient of each of the shock absorbers based on the vertical vibration state quantity and according to a predetermined control law suitable for an assumption that all of the wheels touch ground.

The controller is configured to perform, when a specific condition including a condition that at least one of the wheels is an ungrounded wheel which does not touch the ground and each of the other wheels is a grounded wheel which touches the ground is satisfied ("Yes" at Step 340 and "Yes" at Step 345, "Yes" at Step 520 and "Yes" at Step 530, "Yes" at Step 620 and "Yes" at Step 630), a specific control for setting the damping coefficient of the shock absorber corresponding to the grounded wheel to a first specific value greater than the minimum value (Step 350), instead of the ordinary control.

The shock absorber corresponding to the ungrounded wheel cannot generate the damping force, because the ungrounded wheel does not touch the ground. Therefore, if the "ordinary control for setting the damping coefficient of each of the shock absorbers according to the predetermined control law which is suitable for the assumption that all of the wheels are the grounded wheels" is performed when the specific condition is satisfied, sufficient damping force cannot be generated. Hereby, the vibration of the vehicle body cannot be sufficiently damped/attenuated. Accordingly, the ride comfortability and the drivability are degraded. In view of this, when the specific condition is satisfied, the present device performs, instead of the ordinary control, the specific control for setting the damping coefficient of the shock absorber corresponding to the grounded wheel to the first specific value. According to the present device, even when the specific condition is satisfied, the sufficient damping force can be generated so that the vibration of the vehicle body can be more preferably damped/attenuated. Accordingly, the ride comfortability and the drivability can be improved when the vehicle is traveling on the extremely rough/uneven road where the specific condition is easy to be satisfied.

In one embodiment of the present disclosure, the controller is configured to set the damping coefficient of the shock absorber corresponding to the ungrounded wheel to a second specific value smaller than the first specific value (Step 360), when the specific condition is satisfied.

According to this embodiment, impact which occurs when the ungrounded wheel touches the ground can be damped/weakened more easily, because the damping coefficient of the shock absorber corresponding to the ungrounded wheel is set to the second specific value smaller than the first specific value. Accordingly, the ride comfortability and the drivability when the vehicle is traveling on the extremely rough/uneven road can be improved.

In one embodiment of the present disclosure, the controller is configured to use the maximum value as the first specific value (Step 350).

Hereby, the shock absorber corresponding to the grounded wheel can generate the sufficient damping force when the specific condition is satisfied so that the vibration of the vehicle body can be more appropriately damped/attenuated.

In one embodiment of the present disclosure, the controller is configured to use the minimum value as the second specific value (Step 360).

Hereby, in the case where the specific condition is satisfied, the shock absorber corresponding to the ungrounded wheel can damp/weaken the impact which occurs when the ungrounded wheel touches the ground.

In one embodiment of the present disclosure, the controller is configured to determine that the specific condition is satisfied when each of two wheels which are arranged diagonally to each other is the ungrounded wheel and each of the other two wheels is the grounded wheel ("Yes" at Step 340 and "Yes" at Step 345, "Yes" at Step 520 and "Yes" at Step 530, "Yes" at Step 620 and "Yes" at Step 630).

When one of the wheels runs onto an obstacle, it is likely that a state occurs, "the state where both a first wheel which runs onto the obstacle and a second wheel which is arranged diagonally to the first wheel are the grounded wheels, and the other two wheels (out of four) which are arranged diagonally to each other are the ungrounded wheels". When this state occurs, the vehicle is likely to run onto the relatively high obstacle so that vehicle body vibrates strongly. Hereby, the shock absorber corresponding to the grounded wheel needs to generate the greater damping force. According to the above embodiment, when each of the two wheels which are arranged diagonally to each other is the ungrounded wheel and each of the other wheels is the grounded wheel, it is determined that the specific condition is satisfied. Thus, the above embodiment can determine correctly that one of the wheels runs onto the obstacle. Therefore, in the state where the shock absorber corresponding to the grounded wheel needs to generate the greater damping force, the damping coefficient of the shock absorber can be set to the first specific value certainly.

In one embodiment of the present disclosure, the vehicle further comprises a traction control device (40, 44, 46FL though 46RR) for generating braking force to the wheel which is slipping. Furthermore, in this embodiment, the controller is configured to determine that the specific condition is satisfied when the traction control device is applying the braking force to two wheels which are arranged diagonally to each other and is applying no braking force to the other two wheels ("Yes" at Step 340, "Yes" at Step 345).

When the wheel is the ungrounded wheel, this wheel slips. The traction control device applies the braking force to such a slipping wheel. The present device according to the embodiment determines that the wheel to which the traction control device is applying the braking force is the ungrounded wheel and the wheel to which the traction control device is applying no braking force is the grounded wheel. Therefore, the above embodiment can determine whether the wheel is the grounded wheel or the ungrounded wheel correctly.

In one embodiment of the present disclosure, the damping force control device comprises wheel speed sensors for detecting a rotation speed of each of the wheels. Furthermore, in this embodiment, the controller is configured to determine whether each of the wheels is the ungrounded wheel or the grounded wheel based on the rotation speeds detected by the speed sensors.

As described above, the rotation speed of the ungrounded wheel becomes higher, because the ungrounded wheel is slipping. The above embodiment determines whether the wheel is the grounded wheel or the ungrounded wheel based on the rotation speed of the wheel. Therefore, the above embodiment can determine whether the wheel is the grounded wheel or the ungrounded wheel correctly.

In one embodiment of the present disclosure, the damping force control device further comprises vehicle height sensors (34FL through 34RR), each detecting vehicle height at the position of each of the wheels. Furthermore, in this embodiment, the controller is configured to determine that the wheel corresponding to the vehicle height which is equal to or higher than a threshold height is the ungrounded wheel and that the wheel corresponding to the vehicle height which is lower than the threshold height is the grounded wheel (Step 620, Step 630).

When the wheel is the ungrounded wheel, the height of the vehicle body at the position corresponding to the ungrounded wheel becomes high/large. The above embodiment determines that the wheel corresponding to the vehicle height which is equal to or higher than the threshold height is the ungrounded wheel and the wheel corresponding to the vehicle height which is lower than the threshold height is the grounded wheel. Therefore, the above embodiment can determine whether the wheel is the grounded wheel or the ungrounded wheel correctly.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAIL DESCRIPTION

A damping force control device according to each of embodiments of the present disclosure will next be described with reference to the accompanying drawings.

First Embodiment (Configuration)

Figure 1:
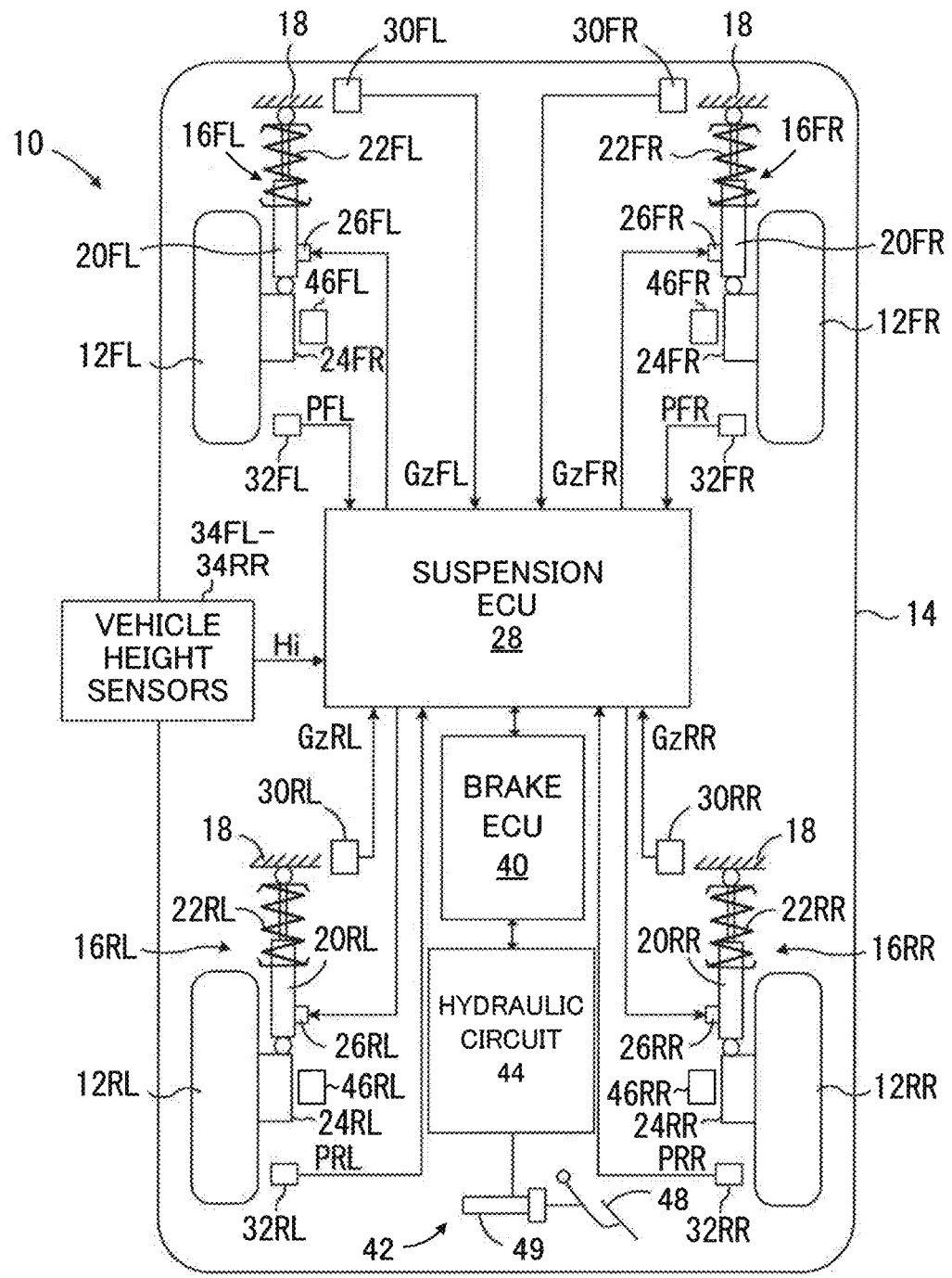
FIG. 1 is a schematic system configuration diagram of a damping force control device (a first device) according to a first embodiment.

As shown in FIG. 1, a damping force control device 10 (hereinafter, referred to as a "first device") according to a first embodiment is applied to a vehicle 14 comprising a front left wheel 12FL, a front right wheel 12FR, a rear left wheel 12RL, and a rear right wheel 12RR. Each of the front left wheel 12FL and the front right wheel 12FR is a steered wheel, and each of the rear left wheel 12RL and the rear right wheel 12RR is a non-steered wheel. The front left wheel 12FL and the front right wheel 12FR are suspended from a vehicle body 18 by suspensions 16FL and 16FR, respectively. The rear left wheel 12RL and the rear right wheel 12RR are suspended from the vehicle body 18 by suspensions 16RL and 16RR, respectively. Hereinafter, when the front left wheel 12FL, the front right wheel 12FR, the rear left wheel 12RL, and the rear right wheel 12RR do not need to be distinguished from each other, they are referred to as "wheels 12". When the suspension 16FR through 16RR do not need to be distinguished from each other, they are referred to as "suspensions 16".

The suspensions 16FL through 16RR include shock absorbers 20FL through 20RR, respectively, and suspension springs 22FL through 22RR, respectively. Wheel carriers 24FL through 24RR support the wheels 12FL through 12RR, respectively, in such a manner that the wheels 12FL through 12RR can rotate. The wheel carriers 24FL through 24RR are connected to the vehicle body 18 by unillustrated suspension arms, respectively, in such a manner that the wheel carriers 24FL through 24RR can move mainly in a vertical direction. The shock absorbers 20FL through 20RR are arranged between the vehicle body 18 and the wheel careers 24FL through 24RR or the suspension arms, respectively. The shock absorbers 20FL through 20RR extend substantially in the vertical direction. Hereinafter, when the shock absorbers 20FL through 20RR do not need to be distinguished from each other, they are referred to as "shock absorbers 20". When the suspension springs 22FL through 22RR do not need to be distinguished from each other, they are referred to as "suspension springs 22". When the wheel carriers 24FL through 24RR do not need to be distinguished from each other, they are referred to as "wheel carriers 24".

A part of the vehicle body 18 at a position corresponding to one of the shock absorbers 20 and one of the suspension springs 22 can move at least in the vertical direction with respect to the corresponding one of the wheels 12, when that one of the shock absorbers 20 and that one of the suspension springs 22 expands and contracts. Therefore, a sprung mass part of the vehicle 14 comprises the vehicle body 18, a part of each of the shock absorbers 20, a part of each of the suspension arms, and the like. An unsprung mass part of the vehicle 14 comprises each of the wheels 12, each of the wheel carriers 24, the other part of each of the shock absorbers 20, the other part of each of the suspension arms, and the like.

Each of the suspension springs 22 reduces "an amount of vertical movement of the each of the wheels 12 due to an up-down fluctuation in the vertical direction of a surface of the road", and weakens "an impact force which each of the wheels 12 receives from the road and which is transmitted to the sprung mass part". Each of the shock absorbers 20 generates a damping force for damping/attenuating the vibration caused by the relative movement in the vertical direction between the sprung mass part and the unsprung mass part. The shock absorbers 20FL through 20RR comprise actuators 26FL through 26RR, respectively. Each of the actuators 26FL through 26RR changes an opening amount of a built-in damping force generation valve (throttle valve) of corresponding one of the shock absorbers 20FL through 20RR. Hereinafter, when the actuators 26FL though 26RR do not need to be distinguished from each other, they are referred to as "actuators 26".

Each of the shock absorbers 20 can vary/change a damping coefficient $C_i$ (i=FL, FR, RL, and RR) to any one of a plurality of values (discrete values). The number of the values is "n" which is an integer equal to or greater than "2". In other words, a generation characteristic/property of the damping force of each of the shock absorbers 20 is set at/to any one of control stages among "n" kinds of control stages $S_m$ ("m" is an integer from "1" to "n".). At the control stage $S_1$ (referred to as a "soft control stage"), the damping coefficient $C_i$ (i=FL, FR, RL, and RR) is set at/to the minimum value. At the control stage $S_n$ (referred to as a "hard control stage"), the damping coefficient $C_i$ (i=FL, FR, RL, and RR) is set at/to the maximum value. Each of the shock absorbers 20 generates the damping force $F_i$ (i=FL, FR, RL, and RR) expressed by a product ($=C_i*V_{rei}$) of the damping coefficient $C_i$ and a vertical relative speed $V_{rei}$ (i=FL, FR, RL, and RR). The vertical relative speed $V_{rei}$ is a relative speed between the vehicle body 18 and the corresponding one of the wheels 12FL through 12RR.

A suspension ECU 28 of the first device controls each of the actuators 26. Vertical acceleration sensors 30FL through 30RR for detecting vertical accelerations GzFL though GzRR, respectively, are arranged at positions corresponding to the wheels 12FL through 12RR in the vehicle body 18, respectively. Each of the vertical acceleration sensors 30FL though 30RR detects the vertical accelerations GzFL through GzRR, respectively. Each of the vertical accelerations GzFL through GzRR is indicative of the vertical acceleration of the vehicle body 18 (the sprung mass part) at the position corresponding to one of the wheels 12FL through 12RR. Hereinafter, when the vertical acceleration sensors 30FL through 30RR do not need to be distinguished from each other, they are referred to as "vertical acceleration sensors 30". Furthermore, the vertical accelerations GzFL though GzRR may be referred to as "vertical vibration status quantities". A signal indicative of each of the vertical accelerations GzFL through GzRR is transmitted to the suspension ECU 28.

Figure 3:
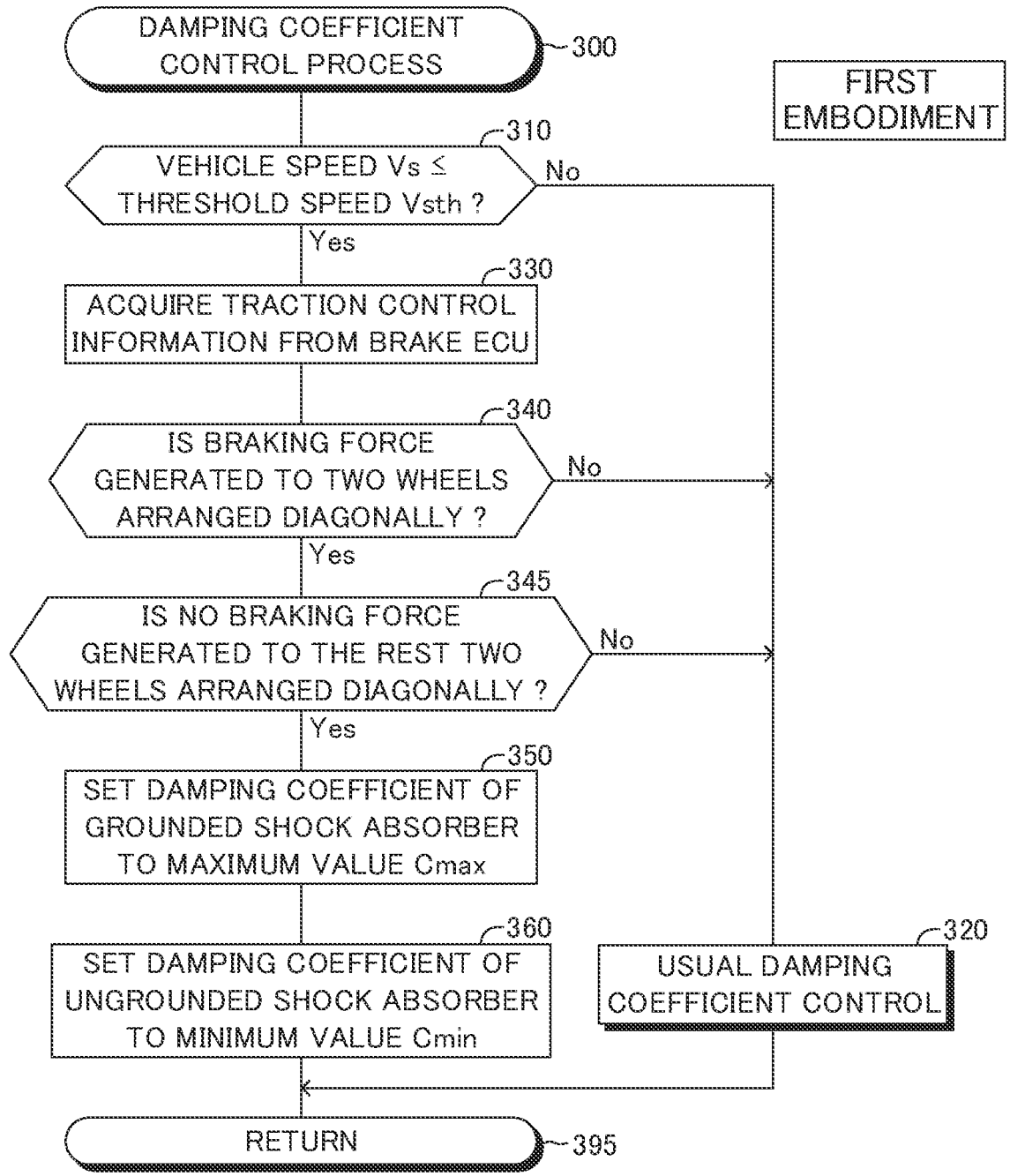
FIG. 3 is a flowchart illustrating a routine executed by a CPU of a suspension ECU illustrated in FIG. 1.

The suspension ECU 28 sets/varies the coefficient of each of the shock absorbers 20 through executing a control program corresponding to a flow chart illustrated in FIG. 3 based on the vertical accelerations GzFL through GzRR, so as to control the damping force Fi of each of the shock absorbers 20. In the present specification, the ECU is an abbreviation of an "Electronic Control Unit" which includes a microcomputer as a main part. The microcomputer includes a CPU, a ROM, a RAM, an interface I/F, and the like. The CPU achieves various functions described later through executing control programs (instruction routines) stored in the ROM.

The vehicle 14 comprises wheel speed sensors 32FL through 32RR and vehicle height sensors 34FL through 34RR at positions corresponding to the wheels 12FL through 12RR. Hereinafter, when the wheel speed sensors 32FL through 32RR do not need to be distinguished from each other, they are referred to as "wheel speed sensors 32". When the vehicle height sensors 34FL through 34RR do not need to be distinguished from each other, they are referred to as "vehicle height sensors 34".

Each of the wheel speed sensors 32 generates one pulse signal Pi when the corresponding one of the wheels 12 rotates by a predetermined angle. The suspension ECU 28 counts the number of the pulse signals Pi (i=FL, FR, RL, and RR) transmitted from each of the wheel speed sensors 32 for/within a predetermined time to calculate a rotation speed (a wheel speed) Vi (i=FL, FR, RL, and RR) of the corresponding one the wheels 12 based on the number of the pulse signals. The suspension ECU 28 calculates a vehicle speed Vs indicative of a speed of the vehicle 14 based on the rotation speeds Vi of the wheels 12. For example, the vehicle speed Vs is an average value of the rotation speeds of the two wheels other than the minimum rotation speed and the maximum rotation speed.

The vehicle height sensors 34 detect vehicle heights Hi (i=FL, FR, RL, and RR) at the positions corresponding to the wheels 12FL through 12RR. For example, each of the vehicle height sensors 34 detects a distance between a lower arm supporting the corresponding one of the wheels 12 and the vehicle body 18 at the position corresponding to one of the wheels 12 as the vehicle height Hi.

The first device comprises a brake ECU 40. The vehicle 14 comprises a braking device 42 for generating braking force to each of the wheels 12. The braking device 42 comprises a hydraulic circuit 44, wheel cylinders 46FL, 46FR, 46RL, and 46RR, and a master cylinder 49. Each of the wheel cylinders 46FL, 46FR, 46RL, and 46RR is arranged in the corresponding one of the wheels 12FL through 12RR. The master cylinder 49 pressurizes working oil in response to a pressing (depressing) operation of a brake pedal 48 by the driver. The hydraulic circuit 44 comprises a reservoir, an oil pump, various valve devices, and the like (those are not illustrated in FIG. 1). The hydraulic circuit 44 functions as a brake actuator. Hereinafter, when the wheel cylinders 46FL through 46RR do not need to be distinguished from each other, they are referred to as "wheel cylinders 46".

The brake device 42 generates/applies the braking force in proportion to pressure of each of the wheel cylinder 46 to each of the wheels 12. Normally, the brake ECU 40 controls the pressure of each of the wheel cylinders 46 in response to pressure (master cylinder pressure Pm) of the master cylinder 49 which is driven in response to the pressing (depressing) operation of a brake pedal 48 by the driver. In other words, the brake ECU 40 controls the pressure of each of the wheel cylinders 46 based on the master cylinder pressure Pm.

The brake ECU 40 has a traction control function for applying the braking force to the wheel which is slipping. The brake ECU 40 obtains/acquires the rotation speed Vi of each of the wheels 12 from the suspension ECU 28 so as to determine whether or not each of the wheels 12 is slipping based on the rotation speed Vi. This determination process will later be described in detail. When there is at least one wheel which is determined to be slipping (hereinafter, referred to as a "slipping wheel"), the brake ECU 40 controls the pressure of the wheel cylinder corresponding to that slipping wheel in order to apply the braking force to that slipping wheel. Consequently, when there is the at least one slipping wheel, the braking force is applied to the at least one slipping wheel regardless of amount of the pressing (depressing) operation of the brake pedal 36 by the driver. It should be noted that the above described function of the brake ECU 40 has been well known as a traction control, and is disclosed in, for example, Japanese Patent Application Laid-open No. 2013-133085 and Japanese Patent Application Laid-open No. 2000-344085.

When the brake ECU 40 receives a request from the suspension ECU 28, the brake ECU 40 transmits traction control information to the suspension ECU 28. When there is no wheel to which the braking force is applied due to slipping, the traction control information indicates/represents this fact. On the other hand, when there is the wheel to which the braking force is applied due to slipping, the traction control information includes an identifier of that wheel (namely, information specifying that braking applied wheel).

<Outline of Operation>

Figure 2:
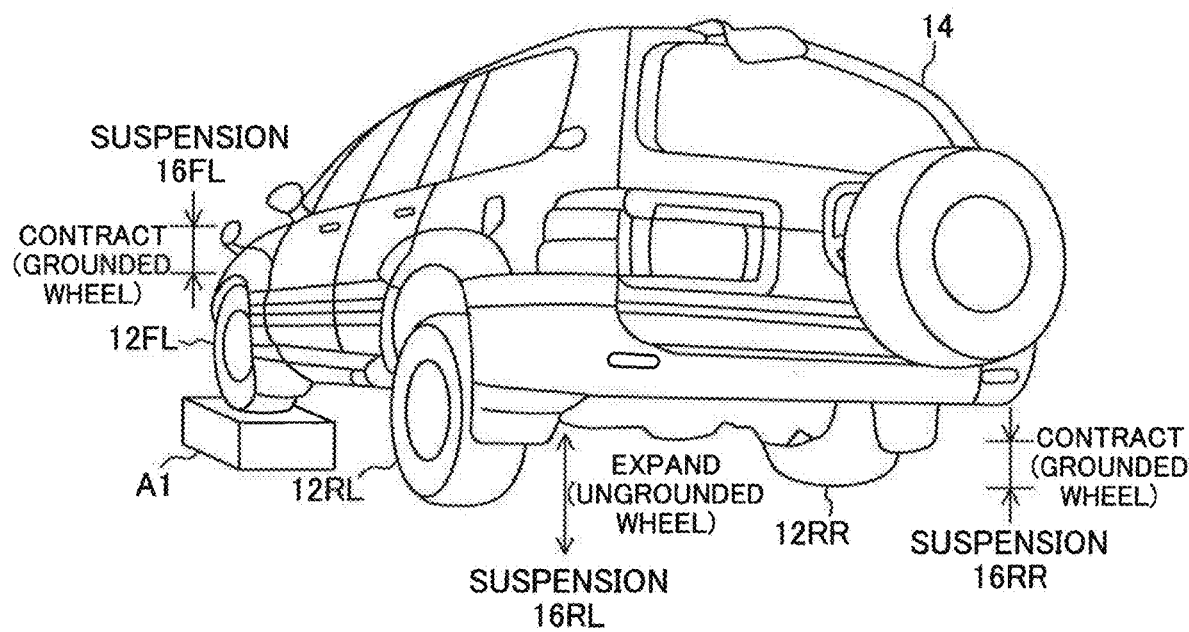
FIG. 2 is a diagram for illustrating a state of each of suspensions when a front left wheel runs onto an obstacle.

When the vehicle 14 is traveling/moving on an extremely rough/uneven road (e.g. an off-road), an unground state occurs. The unground state is a state where two wheels arranged diagonally to each other in the vehicle 14 do not touch the ground, and the other two wheels arranged diagonally to each other in the vehicle 14 touch the ground. For example, as illustrated in FIG. 2, when the front left wheel 12FL runs onto the obstacle A1, both the suspension 16FL of the front left wheel 12FL and "the suspension 16RR of the rear right wheel 12RR which is arranged diagonally to the front left wheel 12FL" contract so that both of the front left wheel 12FL and the rear right wheel 12RR continue touching the ground. On the other hand, both the suspension 16FR of the front right wheel 12FR and "the suspension 16RL of the rear left wheel 12RL which is arranged diagonally to the front right wheel 12FR" expand so that vertical force at each of the wheels 12FR and 12RL decreases. As a result, the wheels 12FR and 12RL may float in the air, in other words, the wheels 12FR and 12RL may not touch the ground.

The shock absorber 20FR of the wheel 12FR which does not touch the ground and the shock absorber 20RL of the wheel 12RL which does not touch the ground cannot generate the damping force. Hereinafter, the wheel which does not touch the ground may be referred to as an "ungrounded wheel 12", and the shock absorber 20 of the ungrounded wheel 12 may be referred to as an "ungrounded shock absorber 20". The vibration of the vehicle body 18 needs to be damped/attenuated by the damping force which is generated by the shock absorber 20FL of the wheel 12FL which touches the ground and the shock absorber 20RR of the wheel 12RR which touches the ground. Hereinafter, the wheel which touches the ground may be referred to as a "grounded wheel 12", and the shock absorber 20 of the grounded wheel 12 may be referred to as a "grounded shock absorber 20". Therefore, in this case, the grounded shock absorbers 20FL and 20RR need to generate the damping force greater than usual.

When the state where all of the wheels 12 touch the ground (in other words, the state where all of the wheels 12 are the grounded wheels) occurs, the suspension ECU 28 calculates the target damping coefficient Cti of each of the shock absorbers 20 according to an ordinary control law for damping/attenuating the vibration of the vehicle body 18. The ordinary control law is a well-known control law according to a skyhook theory, an H∞ control theory, or the like. The state where all of the wheels 12 touch the ground may be referred to as an "all wheels grounded state". The suspension ECU 28 controls the actuators 26 in such a manner that each of actual damping coefficients Ci coincides with (becomes equal to) the corresponding target damping coefficient Cti.

As illustrated in FIG. 2, when both of the two wheels 12FR and 12RL which are arranged diagonally to each other do not touch the ground and both of the other two wheels 12FL and 12RR which are arranged diagonally to each other touch the ground, a specific condition is satisfied. In this case, the ungrounded shock absorbers 20FR and 20RL cannot generate the damping force. Therefore, the damping force FFL generated by the grounded shock absorber 20FL and the damping force FRR generated by the grounded shock absorber 20RR only are applied to the vehicle body 18. However, the target coefficients Cti are calculated based on the above described ordinary control law on the assumption that all of the wheels 12FR through 12RR are the grounded wheels. Accordingly, when the ungrounded state occurs, it is unlikely that the sufficient damping force can be applied to the vehicle body 18. Therefore, it is likely that such insufficient damping force cannot damp/attenuate the vibration of vehicle body 18.

In view of the above, when the above described specific condition is satisfied, the first device does not calculate/determine the target damping coefficients Cti based on the above described ordinary control law, but sets each of the target damping coefficients CtFL and CtRR of the grounded shock absorbers 20FL and 20RR to a maximum damping coefficient Cmax which corresponds to the maximum control stage Sn. Each of the grounded shock absorbers 20FL and 20RR applies sufficient damping force to the vehicle body 18 so as to be able to damp/attenuate/absorb the vibration of the vehicle body 18. Furthermore, each of the damping coefficients CFL and CRR of the grounded shock absorber 20FL and 20RR is set to/at a sufficiently greater value so that sufficient driving force can be transmitted/conveyed to the grounded wheels 12FL and 12RR.

<Specific Operation>

The CPU of the suspension ECU 28 (hereinafter, when simply described as "CPU", the "CPU" means the CPU of the suspension ECU 20 unless otherwise specified) is configured to execute a routine (a damping coefficient control routine) represented by a flowchart shown in FIG. 3, every time a predetermined time period elapses.

When a predetermined timing has come, the CPU starts processes from Step 300, and proceeds to Step 310. At Step 310, the CPU calculates the vehicle speed Vs based on the rotation speeds Vi to determine whether or not the calculated vehicle speed Vs is equal to lower than a threshold speed Vsth. The vehicle speed Vs is equal to lower than a certain upper limit value, when the vehicle is moving/traveling on the extremely rough road. Thus, the threshold speed Vsth is set at/to the upper limit value. For example, the threshold speed Vsth is set at "15 km/h".

When the vehicle speed Vs is higher than the threshold speed Vsth, the CPU determines that the vehicle 14 does not travel on the extremely rough road. In this case, the CPU makes a "No" determination at Step 310, and proceeds to Step 320 to calculate/determine the target damping coefficients Ci according to the above described ordinary control law. Thereafter, the CPU proceeds to Step 395 to tentatively terminate the present routine.

Step 320 is described in more detail below.

The CPU calculates each of the vertical relative speeds Vrei between the corresponding one of the wheels 12FL through 12RR and the vehicle body 18, using the corresponding one of the vertical accelerations GzFL through GzRR. A method for calculating each of the vertical relative speeds Vrei based on the corresponding one of the vertical acceleration GzFL through GzRR is described in, for example, Japanese Patent Application Laid-open No. H10-000912.

The CPU may adopt a differential value of each of the vehicle heights Hi detected by the vehicle height sensors 34 as the corresponding one of the vertical relative speeds Vrei. Alternatively, vertical accelerations Zbdi of the vehicle body 18 and vertical accelerations Zwdi of the unsprung mass part may be detected, and the CPU may adopt an integral value of a subtraction value (Zbdi−Zwdi) obtained by subtracting each of the vertical accelerations Zwdi from the corresponding one of the vertical accelerations Zbdi, as the corresponding one of the vertical relative speeds Vrei. Each of the vertical accelerations GzFL through GzRR, the vehicle heights Hi, and "the vertical accelerations Zbdi and the vertical accelerations Zwdi" is a value relating to vertical vibration of the sprung mass part at the position of one of the corresponding wheels 12. A term of "a vertical vibration state quantity" may be used as a general term for these values.

Subsequently, the CPU substitutes the vertical relative speeds Vrei into the following equation (1) to acquire the target damping force Fti of each of the shock absorbers 20. "Csf" of the following equation (1) is a damping coefficient of the skyhook control, but the "Csf" may be a damping coefficient of an arbitrary damping force control (e.g. the HD∞ control) for damping/attenuating the vibration of the vehicle body 18 in order to improve the ride comfortability of the vehicle 14.

$$Fti = Csf \cdot Vrei \qquad (1)$$

Figure 4:
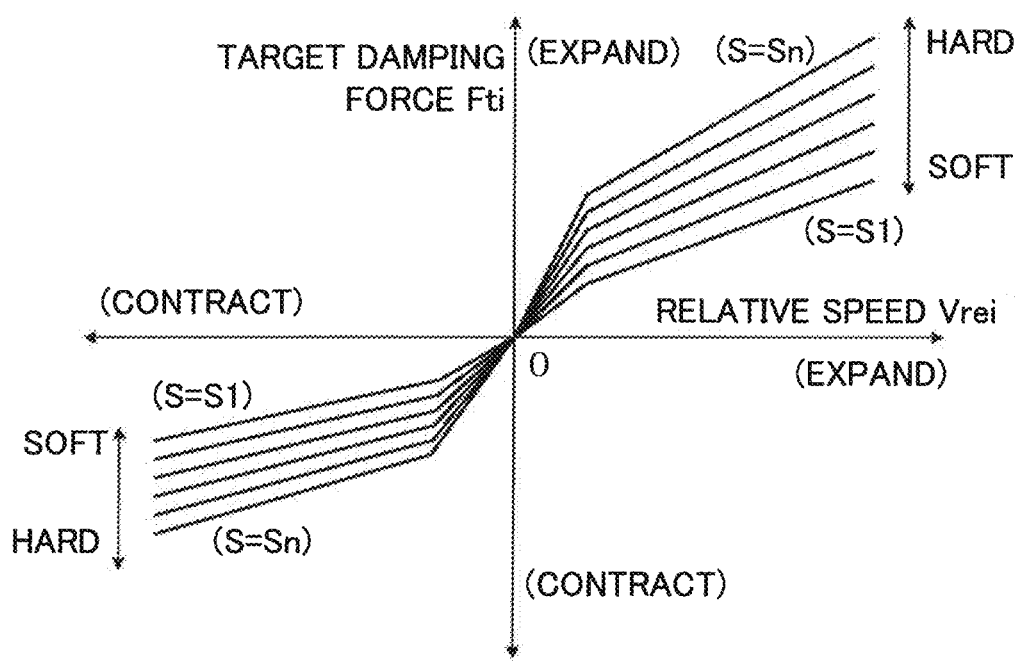
FIG. 4 is a map representing a relationship among a vertical direction relative speed, a target damping force, and a control stage of a shock absorber.

Subsequently, the CPU applies the vertical relative speed Vrei and the target damping force Fti to a map illustrated in FIG. 4 to obtain/acquire the target control stage S for the target damping coefficient Cti. In other words, the CPU substantially acquires the target damping coefficient Cti by determining/obtaining the target control stage S for each of the shock absorbers 20. The CPU controls each of the actuators 26 in such a manner that the actual damping coefficient Ci of the corresponding one of the shock absorbers 20 coincides with the corresponding one of the target damping coefficients Cti, through setting the actual stage S to the target control stage S. The map illustrated in FIG. 4 is stored beforehand in the ROM of the suspension ECU 28, and define a relationship among the vertical relative speed Vrei, the target damping force Fti, and the target control stage S.

When the vehicle speed Vs is equal to or lower than the threshold speed Vsth at the time point at which the CPU proceeds to Step 310, the vehicle 14 may be traveling on the extremely rough road. In this case, the CPU makes a "Yes" determination at Step 310, and executes Steps 330 and 340 in this order.

Step 330: The CPU transmits a request for acquiring the traction control information to the brake ECU 40 in order to receive the traction control information from the brake ECU 40. Consequently, the CPU acquires the traction control information from the brake ECU 40.

Step 340: The CPU determines whether or not the braking force is being applied to one of two sets of two wheels 12 (hereinafter, referred to as "diagonal two wheels") which are arranged diagonally to each other based on the traction control information acquired at Step 330.

In other words, the CPU determines whether or not any one of the following conditions C1 and C2 is satisfied at Step 330.

Condition C1: The braking force is being applied to each of the front right wheel 12FR and the rear left wheel 12RL.    Condition C1:

Condition C2: The braking force is being applied to each of the front left wheel 12FL and the rear right wheel 12RR.    Condition C2:

When any one of the above described conditions C1 and C2 is satisfied, in other words when the braking force is being applied to one of two sets of the diagonal two wheels, the CPU makes a "Yes" determination at Step 340 to proceed to Step 345. At Step 345, the CPU determines whether or not the braking force is not being applied to the other one of the two sets of the diagonal wheels 12.

In other words, the CPU determines whether or not any one of the following conditions D1 and D2 is satisfied at Step 330. It should be noted that either one of the condition D1 and the condition D2 is satisfied, the specific condition is satisfied.

Condition D1: No braking force is being applied to each of the front left wheel 12FL and the rear right wheel 12RR, when the condition C1 is satisfied.

Condition D2: No braking force is being applied to each of the front right wheel 12FR and the rear left wheel 12RL, when the condition C2 is satisfied.

When either one of the condition D1 and the condition D2 is satisfied, in other words when no braking force is being applied to the other one of the two sets of the diagonal wheels 12, it is determined that a set of two wheels 12 which are arranged diagonally to each other is a set of the ungrounded wheels and the other set of two wheels 12 which are arranged to each other is a set of the grounded wheels. In this case, the specific condition is satisfied. When either one of the conditions D1 and D2 is satisfied, the CPU makes a "Yes" determination at Step 345, and executes Steps 350 and 360 in this order. Thereafter, the CPU proceeds to Step 395 to tentatively terminate the present routine.

Step 350: The CPU sets the damping coefficient corresponding to each of the diagonal two wheels which are the grounded wheels to the maximum damping coefficient Cmax corresponding to the maximum control stage Sn.

More specifically, when the condition D1 is satisfied, the CPU sets each of "the damping coefficient of the shock absorber 20FL corresponding to the front left wheel 12FL" and "the damping coefficient of the shock absorber 20RR corresponding to the rear right wheel 12RR" to the maximum damping coefficient Cmax. In contrast, when the condition D2 is satisfied, the CPU sets "the damping coefficient of the shock absorber 20FR corresponding to the front right wheel 12FR" and "the damping coefficient of the shock absorber 20RL corresponding to the rear left wheel 12RL" to the maximum damping coefficient Cmax. The shock absorber 20 corresponding to each of the diagonal two wheels which are the grounded wheels may be referred to as a "grounded shock absorber". The damping coefficient of each of the grounded shock absorbers is changed to the maximum damping coefficient Cmax at Step 350 so that the vibration of the vehicle body 18 can be damped/attenuated efficiently and sufficiently.

Step 360: The CPU sets the damping coefficient corresponding to each of the diagonal two wheels which are the ungrounded wheels to the minimum damping coefficient Cmin corresponding to the minimum control stage S1.

More specifically, when the condition D1 is satisfied, the CPU sets each of "the damping coefficient of the shock absorber 20FR corresponding to the front right wheel 12FR" and "the damping coefficient of the shock absorber 20RL corresponding to the rear left wheel 12RL" to the minimum damping coefficient Cmin. In contrast, when the condition D2 is satisfied, the CPU sets "the damping coefficient of the shock absorber 20FL corresponding to the front left wheel 12FL" and "the damping coefficient of the shock absorber 20RR corresponding to the rear right wheel 12RR" to the minimum damping coefficient Cmin. The shock absorber 20 corresponding to each of the diagonal two wheels which are the ungrounded wheels may be referred to as an "ungrounded shock absorber". The damping coefficient of each of the ungrounded shock absorbers is set to the minimum damping coefficient Cmin at Step 360 so that the impact which occurs when the ungrounded wheel touches the ground can be easily damped/absorbed.

On the other hand, when none of the conditions C1 and C2 is satisfied at the time point at which the CPU proceeds to Step 340, the CPU makes a "No" determination at Step 340 to proceed to Step 320. When none of the conditions D1 and D2 is satisfied at the time point at which the CPU proceeds to Step 345, the specific condition is not satisfied. In this case, the CPU makes a "No" determination at Step 345 to proceed to Step 320. At Step 320, the CPU sets each of the target damping coefficients Ci according to the above described ordinary control law, and proceeds to Step 395 to tentatively terminate the present routine.

As understood from the above description, the first device determines, based on the traction control information, whether or not the "specific condition that each of the two wheels 12 which are arranged diagonally to each other is the ungrounded wheel and each of the other two wheels 12 which are arranged diagonally to each other is the grounded wheel" is satisfied, when the vehicle speed Vs is equal to or lower than the threshold speed Vsth. When the each of the two wheels 12 which are arranged diagonally to each other is the ungrounded wheel and each of the other two wheels 12 which are arranged diagonally to each other is the grounded wheel, the first device determines that the specific condition is satisfied to set the damping coefficient of each of the grounded shock absorbers 20 to the maximum damping coefficient Cmax without following the ordinary control law. Hereby, each of the grounded shock absorbers 20 can apply the sufficient damping force to the vehicle body 18, so that the vibration of the vehicle body 18 can be damped/attenuated.

In addition, when the specific condition is satisfied, the first device sets the damping coefficient of each of the ungrounded shock absorbers 20 to the minimum damping coefficient Cmin. Hereby, the impact which occurs when the ungrounded wheel touches the ground can be absorbed easily, and thus, the ride comfortability and the drivability while the vehicle 14 is traveling on the extremely rough road can be improved.

Second Embodiment

The damping force control device (hereinafter, referred to as a "second device") according to a second embodiment will next be described. The second device differs from the first device in that the second device determines whether each of the wheels 12FL through 12RR is the ungrounded wheel or the grounded wheel, based on (using) the corresponding one of the rotation speeds Vi. Hereinafter, the above difference point will be described mainly.

Figure 5:
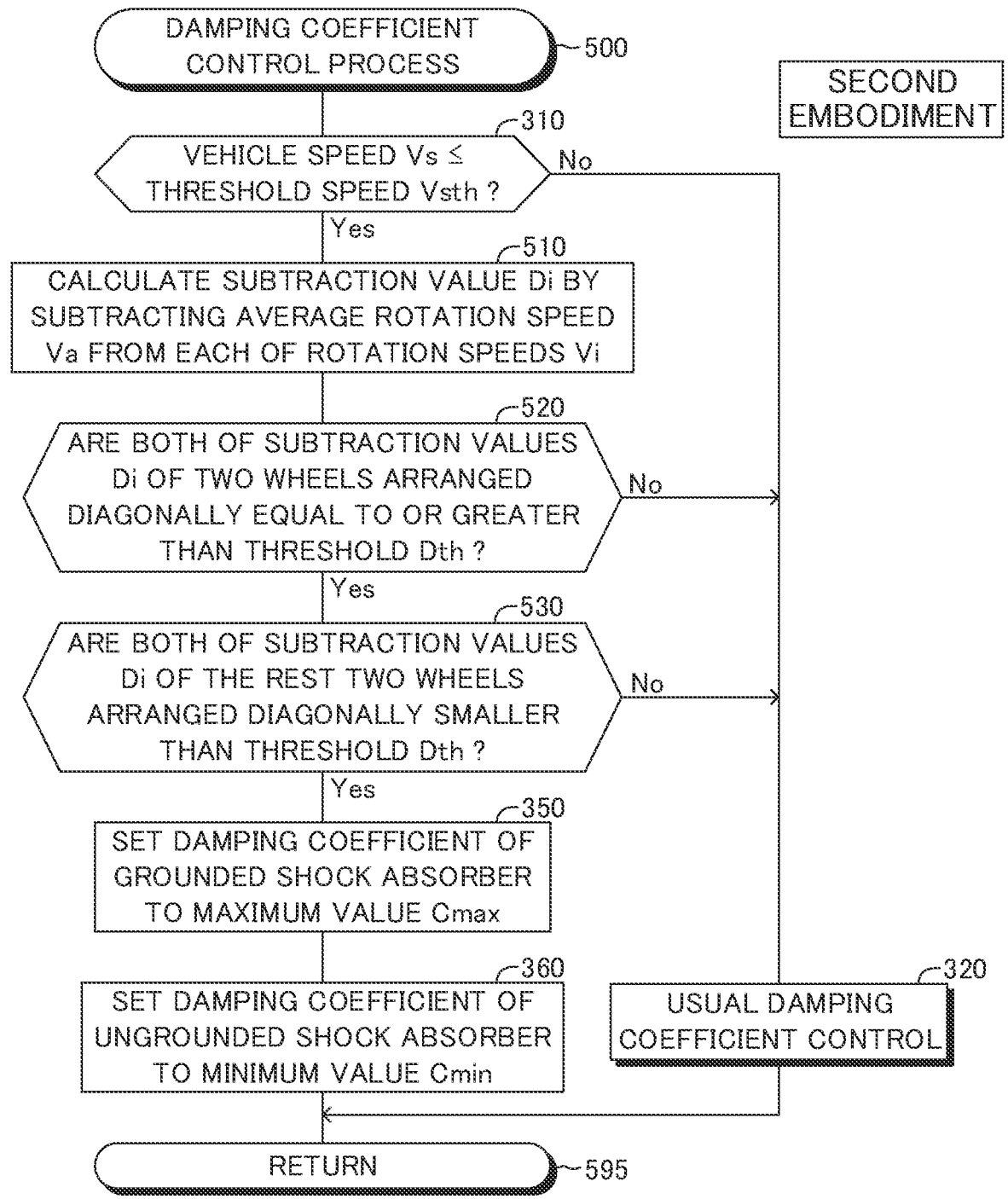
FIG. 5 is a flowchart illustrating a routine executed by a CPU of a suspension ECU included in a damping force control device (a second device) according to a second embodiment.

The CPU of the suspension ECU 28 of the second device is configured to execute a routine represented by a flowchart shown in FIG. 5, in place of the routine represented by the flowchart shown in FIG. 3, every time a predetermined time period elapses. In FIG. 5, the same Steps as the Steps shown in FIG. 3 are denoted with common step symbols for the Steps shown in FIG. 3, and description thereof is omitted.

When a predetermined timing has come, the CPU starts processes from Step 500. When the vehicle speed Vs is equal to or lower than the threshold speed Vsth at this time point, the CPU makes a "Yes" determination at Step 310 shown in FIG. 5, and executes Steps 510 and 520 in this order.

Step 510: The CPU calculates an average (=(VFL+VFR+VRL+VR)/4) of the rotation speeds Vi of the wheels 12 as an average rotation speed Va. Thereafter, the CPU subtracts the average rotation speed Va from each of the rotation speeds Vi (i=FL, FR, RL, and RR) to acquire each of the subtraction values Di (i=FL, FR, RL, and RR) (Di=Vi−Va) of each of the wheels 12FL through 12RR.

When the vehicle 14 is traveling under a four-wheel drive mode, the CPU may calculate, as the average rotation speed Va, an average of the rotation speeds Vi of three wheels 12 other than the wheel whose rotation speed Vi is the maximum. When the vehicle 14 is traveling under a two-wheel drive mode, the CPU may calculate, as the average rotation speed Va, the average of the rotation speeds Vi of two driving wheels.

Step 520: The CPU determines whether or not the subtraction value Di of each of the two wheels 12 which are arranged diagonally to each other is equal to or greater than a threshold Dth. In other words, the CPU determines whether or not either one of the following conditions E1 and E2 is satisfied.

$DFL \geq Dth$ and $DRR \geq Dth$      Condition E1:

$DFR \geq Dth$ and $DRL \geq Dth$      Condition E2:

"The rotation speed Vi of the wheel 12 corresponding to the subtraction value Di which is equal to or higher than the threshold Dth" is sufficiently higher than the average rotation speed Va. It is inferred that the reason why the rotation speed Vi of the wheel 12 is sufficiently higher than the average rotation speed Va is because this wheel 12 does not touch the ground. Therefore, when each of the subtraction values Di of the two wheels 12 which are arranged diagonally to each other is equal to or greater than the threshold Dth, both of those two wheels are the ungrounded wheels. In this case, the CPU makes a "Yes" determination at Step 520 to proceed to Step 530.

At Step 530, the CPU determines whether or not the subtraction value Di of each of the other two wheels 12 which are arranged diagonally to each other is smaller than the threshold Dth. In other words, the CPU determines whether or not either one of the following conditions F1 and F2 is satisfied.

A condition that "DFR<Dth and DRL<Dth" is satisfied, when the condition E1 is satisfied.      Condition F1:

Condition F2: A condition that "DFL<Dth and DRR<Dth" is satisfied, when the condition E2 is satisfied.      Condition F2:

When either one of the conditions F1 and F2 is satisfied, the specific condition is satisfied.

"The rotation speed Vi of the wheel 12 corresponding to the subtraction value Di which is lower than the threshold Dth" is not sufficiently higher than the average rotation speed Va. Therefore, this wheel 12 is likely to be the grounded wheel. When each of the subtraction values Di of the other two wheels which are arranged diagonally to each other is smaller than the threshold Dth, both of those two wheels are the ungrounded wheels. When either one of the conditions F1 and F2 is satisfied, the specific condition is satisfied, because the two wheels arranged diagonally to each other are the grounded wheels and the other two wheels arranged diagonally to each other are the ungrounded wheels. In this case, the CPU makes a "Yes" determination at Step 530, and executes Steps 350 and 360 in this order. Subsequently, the CPU proceeds to Step 595 to tentatively terminate the present routine. Consequently, the damping coefficient of the shock absorber 20 corresponding to the grounded wheel is set to the maximum damping coefficient Cmax, and the damping coefficient of the shock absorber 20 corresponding to the ungrounded wheel is set to the minimum damping coefficient Cmin.

On the other hand, when none of the conditions E1 and E2 is satisfied, that is, when the subtraction value Di of "at least one of the wheels 12 in each of the pairs of two wheels 12 arranged diagonally to each other" is smaller than the threshold Dth, the specific condition is not satisfied. In this case, the CPU makes a "No" determination at Step 520, and proceeds to Step 320. Further, when none of the conditions F1 and F2 is satisfied, that is, when the subtraction value Di of "at least one of the wheels 12 in the other pair of the two wheels 12 arranged diagonally to each other" is equal to or greater than the threshold Dth, the specific condition is not satisfied. In this case, the CPU makes a "No" determination at Step 530, and proceeds to Step 320. At Step 320, the CPU sets the target damping coefficients Ci according to the above described ordinary control law, and proceeds to Step 595 to tentatively terminate the present routine.

As understood from the above description, the second device determines that the wheel having the relatively higher rotation speed Vi is the ungrounded wheel, and the wheel having the relatively lower rotation speed Vi is the grounded wheel. Hereby, the second device can determine correctly whether the wheel 12 is the ungrounded wheel or the grounded wheel. Therefore, the second device can determine correctly whether or not the specific condition is satisfied. The second device can be applied to a vehicle which does not have the traction control function.

Modification Example of Second Embodiment

The CPU according to this modification example calculates an estimation rotation speed Vb instead of the average rotation speed Va at Step 510. In more detail, an unillustrated shift position sensor transmits a signal indicative of a position of an unillustrated shift lever operated by the driver to the suspension ECU 28. An unillustrated drive ECU transmits a signal indicative of a gear position realized/set by an unillustrated transmission of the vehicle 14 to the suspension ECU 28. Furthermore, an engine rotation sensor transmits a signal indicative of a rotation speed of an engine which is a driving source of the vehicle 14 to the suspension ECU 28.

At Step 510, the CPU calculates the estimation rotation speed Vb of the wheels 12 based on "a gear ratio identified by the gear position" and the engine rotation speed. Furthermore, at Step 510, the CPU acquires the subtraction value Di by subtracting the estimation rotation speed Vb from the rotation speed Vi of each of the wheels 12. Thereafter, the CPU proceeds to Step 520. The descriptions of the process at Step 520 and the processes from/after Step 520 are omitted because these steps are the same as the steps in the above described second embodiment.

Third Embodiment

The damping force control device (hereinafter, referred to as a "third device") according to a third embodiment will next be described. The third device differs from the first device and the second device in that the third device determines whether each of the wheels 12 is the ungrounded wheel or the grounded wheel, based on (using) the vehicle height Hi at the position of the corresponding one of the wheels 12. Hereinafter, that difference point will be described mainly.

Figure 6:
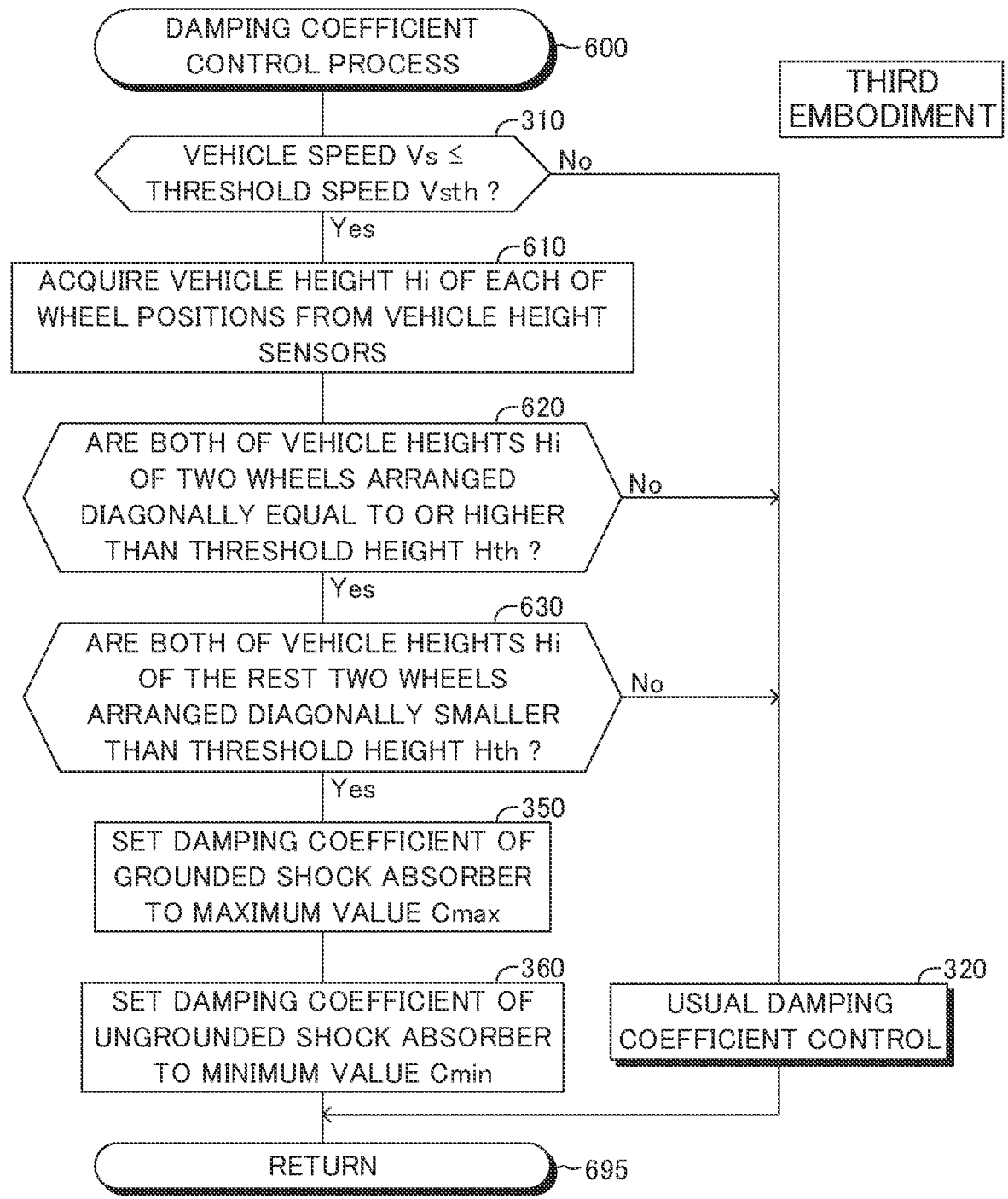
FIG. 6 is a flowchart illustrating a routine executed by a CPU of a suspension ECU included in a damping force control device (a third device) according to a third embodiment.

The CPU of the suspension ECU 28 of the third device is configured to execute a routine represented by a flowchart shown in FIG. 6, in place of the routine represented by the flowchart shown in FIG. 3, every time a predetermined time period elapses. In FIG. 6, the same Steps as the Steps shown in FIG. 3 are denoted with common step symbols for the Steps shown in FIG. 3, and description thereof is omitted.

When a predetermined timing has come, the CPU starts processes from Step 600. When the vehicle speed Vs is equal to or lower than the threshold speed Vsth at this time point, the CPU makes a "Yes" determination at Step 310 shown in FIG. 6, and executes Steps 610 and 620 in this order.

Step 610: The CPU acquires the vehicle height Hi (i=FL, FR, RL, and RR) at the position of each of the wheels 12FL through 12RR from the corresponding one of the vehicle height sensors 34.

Step 620: The CPU determines whether or not each of the vehicle heights Hi at the position of each of the two wheels 12 arranged diagonally to each other is equal to or higher than a threshold height Hth. In other words, the CPU determines whether or not either one of the following conditions G1 and G2 is satisfied.

$HFL \geq Hth$ and $HRR \geq Hth$     Condition G1:

$HFR \geq Hth$ and $HRL \geq Hth$     Condition G2:

The threshold height Hth has been set to/at the vehicle height Hi obtained when the suspension 16 becomes a full stroke state in which an expanding amount of the suspension 16 is the maximum. Therefore, the suspension 16 for the wheel 12 corresponding to the vehicle height Hi which is equal to or higher than the threshold height Hi is in the full stroke state. Meanwhile, the suspension 16 corresponding to the ungrounded wheel is in the full stroke state. Accordingly, the CPU determines that the wheel having the vehicle height Hi which is equal to higher than the threshold height Hth is the ungrounded wheel and the wheel having the vehicle height Hi which is lower than the threshold height Hth is the grounded wheel.

When either one of the conditions G1 and G2 is satisfied (when each of the vehicle heights Hi corresponding to each of the two wheels arranged diagonally to each other is equal to or higher than the threshold height Hth), both of those wheels are the ungrounded wheels. In this case, the CPU makes a "Yes" determination at Step 620, and proceeds to Step 630.

At Step 630, the CPU determines whether or not each of the vehicle heights Hi of the other two wheels 12 arranged diagonally to each other is lower than the threshold height Hth. In other words, the CPU determines whether or not either one of the following conditions H1 and H2 is satisfied.

A condition that "HFR<Hth and HRL<Hth" is satisfied, when the condition G1 is satisfied.     Condition C1:

A condition that "HFL<Hth and HRR<Hth" is satisfied, when the condition G2 is satisfied.     Condition C2:

When either one of the conditions H1 and H2 is satisfied, the specific condition is satisfied.

When both of the vehicle heights Hi of the other two wheels arranged diagonally to each other are lower than the threshold height Hth, both of these two wheels are the ungrounded wheels. When either one of the conditions H1 and H2 is satisfied, the specific condition is satisfied, because the two wheels arranged diagonally to each other are the grounded wheels and the other two wheels arranged diagonally to each other are the ungrounded wheels. In this case, the CPU makes a "Yes" determination at Step 630, and executes Steps 350 and 360 in this order. Subsequently, the CPU proceeds to Step 695 to tentatively terminate the present routine. Consequently, the damping coefficient of the grounded shock absorber is set to the maximum damping coefficient Cmax, and the damping coefficient of the ungrounded shock absorber is set to the minimum damping coefficient Cmin.

On the other hand, when none of the conditions G1 and G2 is satisfied, that is, when the vehicle height Hi of "at least one of the wheels 12 in each of the pairs of two wheels 12 which are arranged diagonally to each other" is lower than the threshold height Hth, the specific condition is not satisfied. In this case, the CPU makes a "No" determination at Step 620, and proceeds to Step 320. When none of the conditions H1 and H2 is satisfied, that is, when the vehicle height Hi of "at least one of the wheels 12 in the other pair of the two wheels 12 which are arranged diagonally to each other" is equal to or higher than the threshold height Hth, the specific condition is not satisfied. In this case, the CPU makes a "No" determination at Step 630, and proceeds to Step 320. At Step 320, the CPU sets the target damping coefficients Ci according to the above described ordinary control law, and proceeds to Step 695 to tentatively terminate the present routine.

As understood from the above description, the third device determines that the wheel 12 having the relatively high vehicle height Hi (i.e., the wheel 12 corresponding to the suspension 16 which is in the full stroke state) is the ungrounded wheel, and the wheel 12 having the relatively low vehicle height Hi (i.e., the wheel 12 corresponding to the suspension 16 which is not in the full stroke state) is the grounded wheel. Hereby, the third device can determine correctly whether the wheel 12 is the ungrounded wheel or the grounded wheel. Therefore, the third device can determine correctly whether or not the specific condition is satisfied. The third device can be applied to a vehicle which does not have the traction control function.

The present disclosure is not limited to the above described embodiments, and can adopt various modifications within a scope of the present disclosure.

According to the above described embodiments, when both of the two wheels 12 arranged diagonally to each other are the ungrounded wheels and both of the other two wheels 12 arranged diagonally to each other are the grounded wheels, the CPU determines that the specific condition is satisfied to execute Steps 350 and 360. However, the specific condition is not limited to the above described condition. For example, when at least one of the wheels 12 is the ungrounded wheel and the other wheel(s) is the grounded wheel, the CPU may determine that the specific condition is satisfied.

Further, at Step 350 shown in FIG. 3, FIG. 5, or FIG. 6, the CPU sets the damping coefficient of the grounded shock absorber 20 to the maximum damping coefficient Cmax when the specific condition is satisfied. However, the value to which the damping coefficient of the grounded shock absorber 20 is set is not limited to the maximum damping coefficient Cmax. For example, the value to which the damping coefficient of the grounded shock absorber 20 is set may be a value which is greater than the minimum damping coefficient Cmin and is equal to greater than a predetermined value (a first specific value). The predetermined value (first specific value) has been set to the value such that the grounded shock absorber whose damping coefficient is set to the predetermined value can damp/attenuate the vibration of the vehicle body 18 sufficiently.

Similarly, at Step 350 shown in FIG. 3, FIG. 5, or FIG. 6, the CPU sets damping coefficient of the ungrounded shock absorber 20 to the minimum damping coefficient Cmin when the specific condition is satisfied. However, the value to which the damping coefficient of the ungrounded shock absorber is not limited to the minimum damping coefficient Cmin. For example, the value to which the damping coefficient of the ungrounded shock absorber 20 is set may be a value which is equal to or smaller than a predetermined value. The predetermined value has been set to the value such that the ungrounded shock absorber whose damping coefficient is set to the predetermined value can damp/weaken the impact which occurs when the ungrounded wheel corresponding to this ungrounded shock absorber touches the ground.

It should be noted that a value to which the damping coefficient of the grounded shock absorber 20 is set when the specific condition is satisfied should be greater than a value to which the damping coefficient of the ungrounded shock absorber 20 is set when the specific condition is satisfied.

There has been known a damping force control device disclosed in Japanese Patent Application Laid-open No. H02-60807. This damping force control device identifies a roughness/unevenness level/degree of the road on which the vehicle is traveling. When the identified roughness level represents that the road is a smooth/flat road, this damping force control device sets the damping coefficient of each of the shock absorbers to a value smaller than a usual value. Furthermore, when the identified roughness level represents that the road is the extremely rough road, this damping force control device sets the damping coefficient of each of the shock absorbers to a value greater than the usual value.

According to the above damping force control device disclosed in H02-60807, while the vehicle is traveling on the extremely rough road, the damping coefficient of each of the shock absorbers is always set to a greater value so that a road followability of each of the shock absorbers decreases. Accordingly, the ride comfortability and the drivability may be unsatisfactory.

Whereas, according to the present control device of the present disclosure, the damping coefficient of each of the grounded shock absorbers is set to the first specific value only when the specific condition is satisfied. Therefore, the road followability can be prevented from degrading when the specific condition is not satisfied, and sufficient damping force for damping/attenuating the vibration of the vehicle body 18 can be generated when the specific condition is satisfied.

What is claimed is:

1. A damping force control device comprising:
   a plurality of variable damping shock absorbers configured to vary damping coefficient within a range from a minimum value to a maximum value greater than the minimum value in order to adjust damping force, each of the shock absorbers arranged between a sprung mass part and an unsprung mass part at a position corresponding to each of wheels of a vehicle;
   a detector for detecting vertical vibration state quantity relating to vibration in vertical direction of the sprung mass part at the position of each of the wheels; and
   a controller configured to perform an ordinary control for setting the damping coefficient of each of the shock absorbers based on the vertical vibration state quantity and according to a predetermined control law,
   wherein the controller is configured to perform, when a specific condition including a condition that at least one of the wheels is an ungrounded wheel which does not touch the ground and each of the other wheels is a grounded wheel which touches the ground is satisfied, a specific control for setting the damping coefficient of the shock absorber corresponding to each grounded wheel to a first specific value greater than the minimum value, instead of the ordinary control;
   wherein the controller is further configured to set the damping coefficient of the shock absorber corresponding to the at least one ungrounded wheel to a second specific value smaller than the first specific value, when the specific condition is satisfied, and
   wherein each of the shock absorbers generates a damping force that is a product of the damping coefficient of the respective shock absorber and a vertical relative speed between the sprung mass part and the unspring mass part associated with the respective shock absorber, and wherein the controller controls an actuator of each shock absorber so that a control stage of the respective shock absorber corresponds to the damping coefficient.

2. The damping force control device according to claim 1, wherein the controller is configured to use the maximum value as the first specific value.

3. The damping force control device according to claim 1, wherein the controller is configured to use the minimum value as the second specific value.

4. The damping force control device according to claim 1, wherein the controller is configured to determine that the specific condition is satisfied when each of two wheels which are arranged diagonally to each other is the ungrounded wheel and each of the other two wheels is the grounded wheel.

5. The damping force control device according to claim 1,
   wherein the vehicle comprises a traction control device for applying braking force to the wheel which is slipping, and
   wherein the controller is configured to determine that the specific condition is satisfied when the traction control device is applying the braking force to two wheels which are arranged diagonally to each other and is applying no braking force to the other two wheels.

6. The damping force control device according to claim 1, further comprising wheel speed sensors for detecting a rotation speed of each of the wheels,
   wherein the controller is configured to determine whether each of the wheels is the ungrounded wheel or the grounded wheel based on the rotation speeds detected by the speed sensors.

7. The damping force control device according to claim 1, further comprising vehicle height sensors, each detecting vehicle height at the position of each of the wheels,
   wherein the controller is configured to determine that the wheel corresponding to the vehicle height which is equal to or higher than a threshold height is the ungrounded wheel and that the wheel corresponding to the vehicle height which is lower than the threshold height is the grounded wheel.

\* \* \* \* \*